United States Patent [19]

Reback

[11] 3,959,871

[45] June 1, 1976

[54] METHOD OF SELECTING REPLACEMENT VALVE STEMS

[76] Inventor: Richard L. Reback, 5649 Sorrento Drive, Long Beach, Calif. 90803

[22] Filed: Oct. 18, 1974

[21] Appl. No.: 515,917

[52] U.S. Cl............................... 29/407; 29/428; 29/433; 264/220; 264/225; 264/299; 264/331
[51] Int. Cl.² ........................ B29C 5/00; B29G 7/00
[58] Field of Search.... 264/219, 220, 328, 225–227, 264/299, 310, 311, 317; 206/44.11, 44.12, 44.14; 29/433, 428; 211/13

[56] References Cited
UNITED STATES PATENTS

| | | | |
|---|---|---|---|
| 997,154 | 7/1911 | Slaymaker et al. | 206/44.11 |
| 1,390,044 | 9/1921 | Knoderer | 283/1 A |
| 1,563,148 | 11/1925 | Bartol et al. | 206/44.11 |
| 1,816,598 | 7/1931 | Martin | 206/44.11 |
| 2,622,899 | 12/1952 | Abrams | 35/50 |
| 2,630,601 | 3/1953 | Schiffer et al. | 264/243 |
| 2,846,742 | 8/1958 | Wagner | 264/220 |
| 3,092,245 | 6/1963 | Poisson | 206/45.31 |
| 3,312,197 | 4/1967 | Smith | 264/271 |

OTHER PUBLICATIONS
Randolph et al., Plastics Engineering Handbook, Reinhold, N.Y., (1960), p. 308.

Primary Examiner—Willard E. Hoag
Attorney, Agent, or Firm—Fulwider, Patton, Rieber, Lee & Utecht

[57] ABSTRACT

A method for selecting replacement valve stems to replace corresponding defective valve stems including the steps of selecting a set of pattern valve stems representing the replacement stems and employing such pattern valve stems to construct a mold having coded cavities defining the contour of such pattern valve stems. Fluid plastic is then poured into the cavities of such mold while the mold is spun to force such plastic positively into such cavities under the influence of centrifugal force, the valve stem models formed in such cavities then cured and removed from the mold. The coded valve stem models are then collected together on a display board or the like to be displayed in a market area for viewing by customers so a customer desiring to replace a defective valve stem may compare such defective valve stem with the model valve stem to obtain a code designation to indicate the replacement valve stem corresponding with such defective valve stem.

5 Claims, 12 Drawing Figures

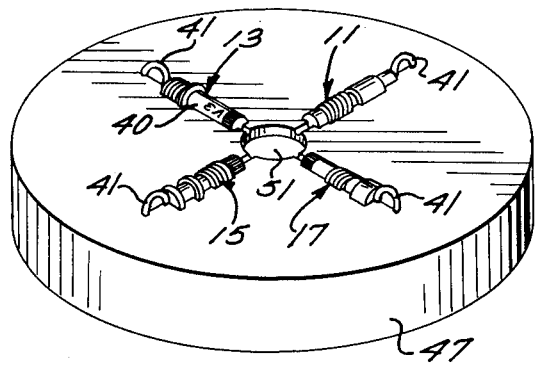
FIG.5
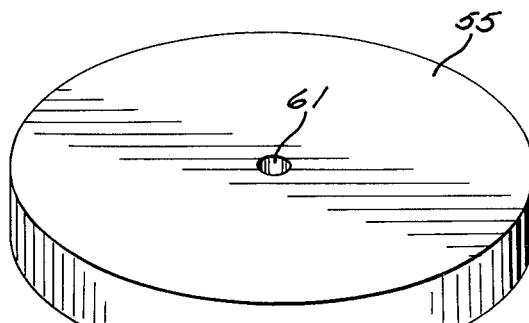
FIG.6
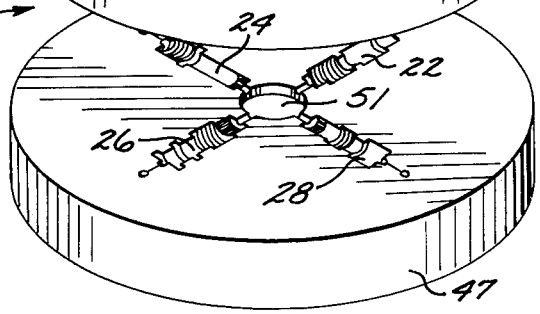
FIG.8
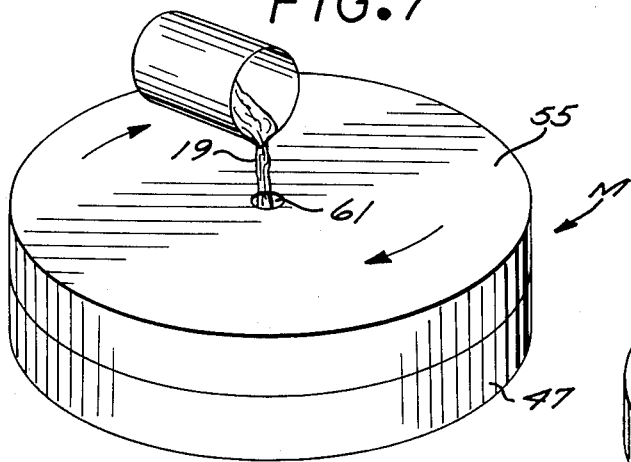
FIG.7
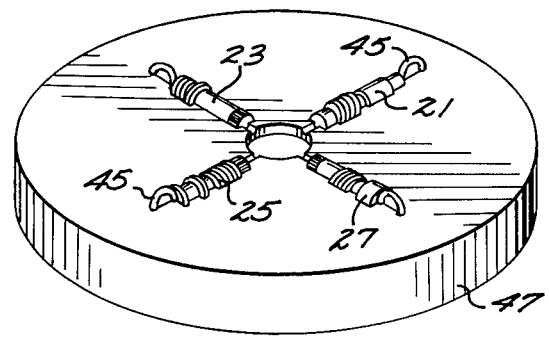
FIG.9
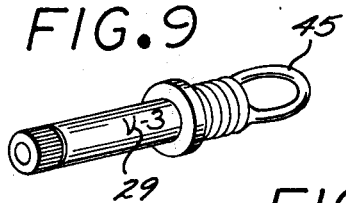
FIG.10
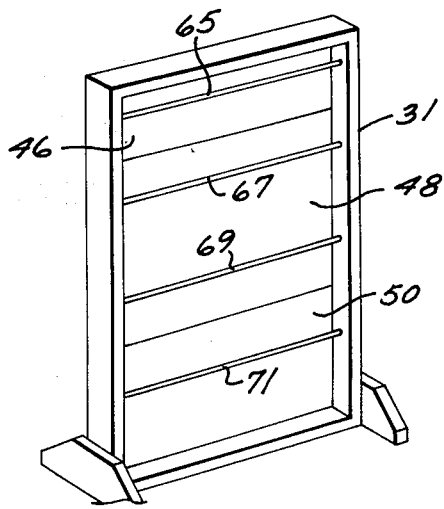
FIG.11
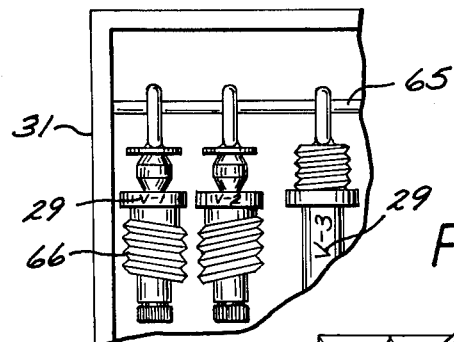
FIG.12
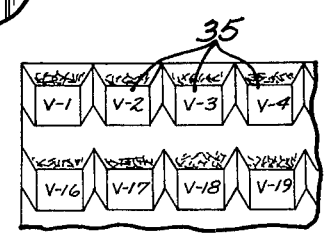

METHOD OF SELECTING REPLACEMENT VALVE STEMS

BACKGROUND OF THE INVENTION

1. Field of the Invention:

The present invention relates to the selection of valve stems to replace defective valve stems employed in water faucets, diverters, mixing valves and the like.

2. Description of the Prior Art:

When it becomes necessary to replace a defective valve stem in an outdated water faucet or the like, difficulty is frequently encountered because the workman cannot conveniently identify a replacement valve stem which is the mechanical equivalent of such defective stem. Consequently, the workman is then forced to replace the entire valve or faucet, thus, in many instances, necessitating tearing away of a large portion of a wall in order to obtain access to the plumbing leading to such faucet or valve. Numerous different manuals have been proposed which display drawings or photographs of various valve stems for comparison with defective stems to assist the workman in selecting a replacement stem. However, such manuals are not generally satisfactory because the workman cannot always be fully assured that the drawing or photograph selected fully corresponds with the defective valve stem to assure that it will serve as an appropriate replacement thereof. Consequently, it is desirable to provide an entire set of three dimensional representative valve stem models for detailed comparison with the defective valve stem so the workman can be assured that he has selected the proper replacement stem. Preferably, the three dimensional valve stem to which the defective valve stem is being compared will be a relatively inexpensive model and will even enable the bonnet, where applicable, from the defective valve stem to be screwed onto the threads thereof to provide positive assurance that the stem selected will accommodate such bonnet.

SUMMARY OF THE INVENTION

The method of the present invention is characterized by the selection of representative valve stems to serve as pattern valve stems and forming a mold from such pattern valve stems to form cavities defining the outlines thereof. Plastic model valve stems are then reproduced in such cavities and are coded to correspond with the replacement valve stems whereby a workman desiring to replace a defective valve stem may compare such defective valve stem with various model valve stems to select a corresponding model valve stem, take code from such model valve stem and select the appropriate replacement valve stem by designation of the selected code.

The objects and advantages of the present invention will become apparent from a consideration of the following detailed description when taken in conjunction with the accompanying drawings.

BRIEF DESCRIPTION OF THE DRAWINGS

FIG. 5 is a perspective view of the mold half shown in FIG. 4, but depicting such mold half in its upright position;

FIG. 6 is a perspective view of both halves of a mold that may be utilized in the method of the present invention and depicting such mold halves separated from one another;

FIG. 7 is a perspective view of the mold halves shown in FIG. 6, but showing such mold halves joined together;

FIG. 8 is a perspective view of the mold half shown in FIG. 5 and displaying the model valve stems formed thereby;

FIG. 9 is a perspective view, in enlarged scale, of a model valve stem shown in FIG. 8;

FIG. 10 is a perspective view of a display board, in reduced scale, on which the model valve stem shown in FIG. 8 may be displayed;

FIG. 11 is a broken front view, in enlarged scale, of the display board shown in FIG. 10 and depicting the valve stem models shown in FIG. 7 displayed thereon; and FIG. 12 is a diagrammatic view of storage bins having replacement valve stems stored therein and coded to correspond with the valve stems shown in FIG. 11.

DESCRIPTION OF THE PREFERRED EMBODIMENT

Figure 1:
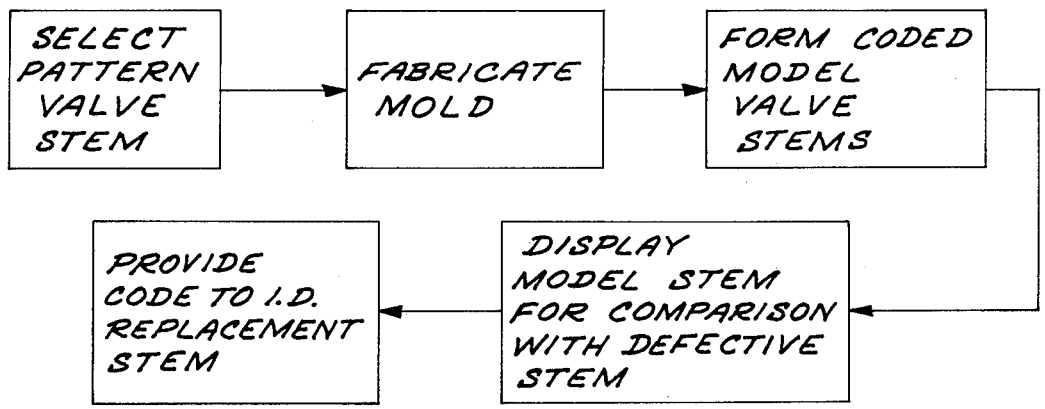
FIG. 1 is a schematic diagram depicting the method of the present invention.

Referring to FIG. 1, the method of the present invention includes, generally, the selection of a plurality of representative pattern valve stems 11, 13, 15 and 17, and forming a mold M (FIg. 6) defining cavities corresponding with such pattern valve stems. The pattern valve stems are then removed from the mold M and casting resin (FIG. 7) poured into such cavities to form model valve stems 21, 23, 25 and 27 (FIG. 8) which are relatively lightweight and inexpensive to manufacture. The model valve stems 21, 23, 25 and 27 are coded with respective code indicia 29 and are displayed on a display board 31 (FIGS. 10 and 11) whereby a workman can compare a defective valve stem with each of the various models 21, 23, 25 and 27, to select the model that mechanically duplicates such defective valve stem and then a replacement stem may be selected from the bin 35 (FIG. 12) coded to correspond with the pattern valve stem 21, 23, 25 or 27, selected.

With the marketing of hardware on the mass scale generally prevailing in present day commerce, it is highly unusual for the hardware salesman to be even remotely familiar with all the numerous various models of valve stems that have been manufactured throughout the last 25 to 50 years that may now need replacement. Consequently, a workman desiring to select a replacement valve stem is faced with great difficulty. The manuals presently available are normally incomplete and the drawings and pictures displayed therein are inadequate for a sufficiently detailed comparison with the defective valve stem to assure that the appropriate replacement stem is being selected. Further, the number of different stem models that must be displayed to assure a comprehensive selection exceeds 400 different stems, thus discouraging the display of actual new valve stems for comparison purposes, since 400 of such stems present a substantial weight problem and the investment in each stem may be between $5.00 and $50.00, thus representing a substantial investment to assemble 400 such stems for display. Further, many valve stems, while differing in appearance, are mechanically equivalent, thus rendering it desirable to set up the codification system such that a single model of replacement valve will act as a replacement for numerous differently appearing, but mechanically equivalent, valves.

Figure 2:
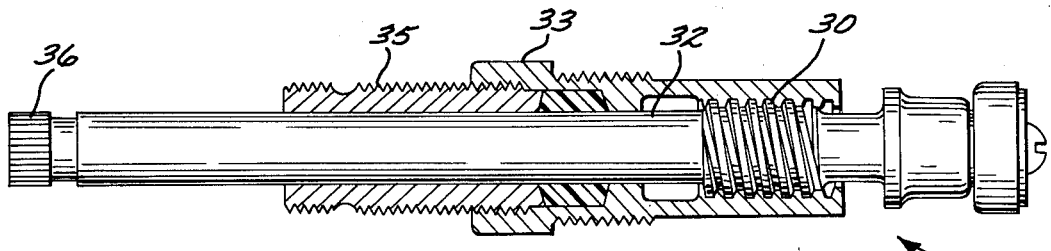
FIG. 2 is a longitudinal sectional view of a pattern valve stem which may be employed in the method of the present invention.

Referring to FIG. 2, representative valve stems conventionally include a through shaft 32 which has exterior driving threads 30 on the valve extremity thereof for engagement with cooperative interior threads in a valve bonnet 33 for drawing such shaft axially with respect thereto upon rotation thereof. The extremity of the shaft 32 opposite the threads 30 is formed with a knurled handle head 36. The shaft is received telescopically and freely rotatable within an externally threaded sleeve 35 which is screwed on one extremity into one extremity of such bonnet and is received on its opposite extremity in an interiorly threaded bore formed in a valve body (not shown).

Figure 3:
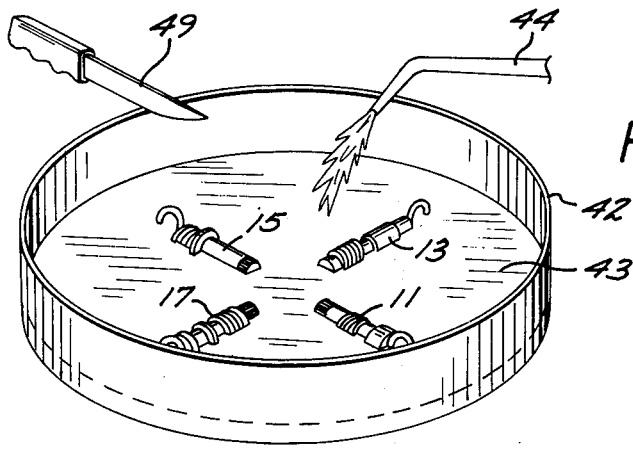
FIG. 3 is a perspective view depicting the use of a plurality of pattern valve stems in the method of the present invention.
Figure 4:
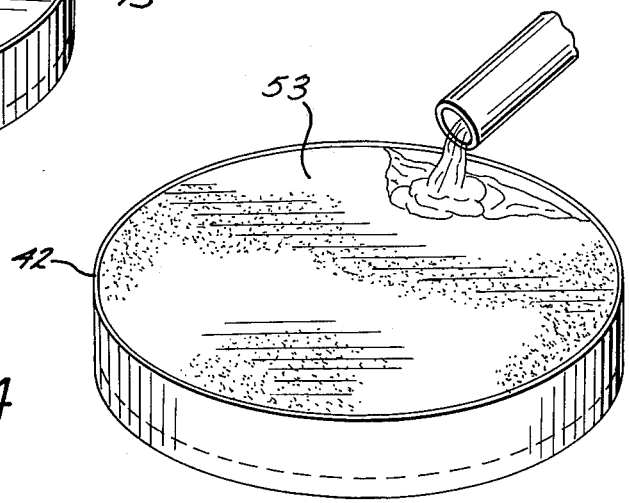
FIG. 4 is a perspective view of an inverted mold half formed in the method of the present invention.

While only four valve stems 11, 13, 15 and 17, have been shown in the accompanying drawings, it will be appreciated that any desirable number of such stems may be employed in forming the mold half 47. The pattern valve stems 11, 13, 15 and 17 (FIG. 5), themselves, may be actual used value stems and may have model rings 41 screwed into the valve ends thereof to define ring cavities to form suspension rings 45 on the model valve stems 21, 23, 25 and 27 (FIG. 5). Preferably, such pattern valve stems 11, 13, 15 and 17 have respective code indicia 40, such as V-1, V-2, etc., inscribed thereon to form a depression which will be duplicated in the valve stem models 21, 23, 25 and 27. In the preferred embodiment, such indicia 40 is oriented on the pattern valve stems 11, 13, 15 and 17 aligned in the plane of the diameter of the rings 45 such that the code indicia 29 on the casted stem models 21, 23, 25 and 27 is also aligned with the plane of the suspension rings 45 so such indicia 29 will be oriented for convenient viewing by the workman when suspended from a transverse suspension rod 65 (FIG. 11). The bottom mold half 47 shown in FIG. 5 may be formed by arranging the pattern valve stems 11, 13, 14 and 17 in a generally radial or spoked configuration in the bottom of a container 42 (FIG. 3) to radiate out from an irrigation ring pattern 51 with the individual stems oriented to dispose the rings 41 in a vertical plane. A layer of wax 43 (FIG. 3) may then be poured into such container to cover one radial half of the stem patterns 11, 13, 15 and 17. Once the wax 43 has cured, the top surface thereof may be smoothed by applying heat thereto from a torch 44 and the detailing thereof completed by utilizing a carving knife 49 or the like to cut away any flash that forms adjacent the stem patterns 11, 13, 15 and 17. Thereafter, an inch or so deep layer of flowable silicon rubber, such as General Electric's RTV700, may be poured into the container 42 to cover the exposed top radial halves of such valve stems 11, 13, 15 and 17, as shown in FIG. 4. Such flowable rubber will flow in and about the details of the pattern stems 11, 13, 15 and 17 to closely approximate the details thereof in forming the first half of the mold cavities 22, 24, 26 and 28 (FIG. 6) in the bottom mold half 47. The silicon rubber is then permitted to cure and the lower mold half removed from the container 42. It will be appreciated that, in practice, the container itself is constructed to be opened along one side to facilitate removal of the mold half 47. It will be noted that since one half of the rings 41 are embedded in the silicon rubber 53, it will be necessary to cut slits 48 (FIG. 5) in such rubber in the planes of such rings to enable removal of the rings 41, as well as the suspension rings 45 (FIG. 10). After removal of such pattern stems 11, 13, 15 and 17 from the bottom mold half, the hardened wax 43 is cleaned from the individual stems and such stems then re-inserted in their respective originala orientation in the bottom mold half cavities 22, 24, 26 and 28 and such mold half inverted to the position shown in FIG. 5 and placed in the same container 42 with the valve stem patterns 11, 13, 15 and 17 remaining therein. The top mold half 55 is then poured thereover to define the second half of the mold cavities 22, 24, 26 and 28 for the respective models 11, 13, 15 and 17. It will be appreciated that with the indicia 40 (FIG. 5) facing upwardly from the bottom mold half 47, the outline thereof will be formed entirely in the top cavity half 24 of the mold half 55, thus avoiding any mold break line running through such indicia which may result in flashing or other mold distortion at the break line which may distort the indicia 29, formed on the final models 11, 13, 15 and 17. If desired, a plug may be suspended in the mold half 55 to form an inlet passage 61 leading to the irrigation ring 51.

The valve stem patterns 11, 13, 15 and 17 may then be removed from the mold halves 47 and 55, such mold halves then brought together and mounted on a rotating fixture and rotated while casting resin 19 is poured into the port 61 to be forced under the influence of centrifugal force about the irrigation ring 51 and radially outwardly to positively fill the cavities 22, 24, 26 and 28 formed by the pattern valve stems 11, 13, 15 and 17, to thus form the model valve stems 21, 23, 25 and 27. To assist the user in his selection, the model valve stems for diverters may be formed of tan colored plastic, those for hot and cold water faucets of bone colored plastic, and those for single valve systems of red plastic. As an alternative, the area 46 of the display planel 31 behind te diverted stems may be painted tan, the area 48 behind the hot and cold water faucet model stems painted a bone color, and the area 50 behind those for single valve systems painted red.

The model valve stems 21, 23, 25 and 27 are then allowed to cure and the mold halves 47 and 55 then separated and such valve stem models removed. Such valve stem models are then trimmed and are ready for display at the retail outlet.

A convenient means for displaying the valve stem models 21, 23, 25 and 27 is a display stand 31 (FIG. 10) having a plurality of removable cross bars 65, 67, 69 and 71, which may receive thereover the respective suspension rings 45 of the valve stem models 21, 23, 25 and 27 selected for display on such stand. The display stand 31 may then be displayed proximate the storage bin 35 for replacement valve stems and such bins encoded to correspond with the code designations 29 for the respective model valve stems 21, 23, 25 and 27. In addition, an index sheet will be provided which includes a list of all the various code indicia for the various model stems 21, 23, 25 and 27 and the corresponding manufacturer's model numbers for replacement valve stems which will act as replacement stems for the corresponding model stems 21, 23, 25 and 27.

In operation, when a customer desires to select a replacement valve stem, he himself may make such selection by merely visually comparing his defective valve stem with the various valve stem models 21, 23, 25 and 27, displayed on the display board 31. For valves incorporating bonnets 33 (FIG. 2), the customer can fit the used valve bonnet over the free end of the model stem to determined if it will screw onto the threads 66 (FIG. 10) thereof to confirm his selection. Once the corresponding model valve stem has been selected, such customer may then merely read off the code indicia 29 and either select the replacement valve stem from the corresponding storage bin 35, or refer to the aforedescribed index sheet to advise the salesman of the desired manufacturer's model number.

From the foregoing, it will be apparent that the method for selecting replacement valve stems of the present invention provides a convenient and economical means for rapidly selecting a replacement valve stem, thus eliminating the prohibitively expensive procedure of replacing the entire faucet or valve from which the defective valve stem has been taken.

Various modifications and changes may be made with regard to the foregoing detailed description without departing from the spirit of the invention.

I claim:

1. The method of making comparison models of valve stems, comprising:
    screwing respective threaded ring members into ends of a plurality of threaded elongated pattern elements having shapes corresponding to various valve stem types;
    placing said elements with said attached members into an open container;
    successively casting curable mold-forming material in said container and about said elements and said members to form upper and lower mold halves;
    removing said elements and said members from said mold halves, leaving plural cavities in said mold halves corresponding to the shapes of said valve stems and said attached ring members, placing said mold halves together and casting curable moldable material in said cavities;
    curing said moldable material to form a plurality of valve stem models having integral ring-like portions by which said models may be suspended and displayed; and
    disposing each said model upon a support member of a display panel, such support member being inserted in at least one said ring.

2. A method as set forth in claim 1 wherein certain of said valve stems are from a first valve type and other of said valve stems are form a second valve type and that includes:
    the step of selecting a moldable material of a first color to pour into the cavities corresponding with said first valve stem type and a moldable material of a second color to pour into the cavities corresponding with the other valve type.

3. A method as set forth in claim 1 that includes:
    the step of forming said cavities with impressions defining selected code indicia.

4. A method as set forth in claim 1 wherein the casting of said curable mold material includes the following steps:
    arranging said pattern elements on their sides on the bottom wall of said container;
    pouring liquid wax in said container to a sufficient level to cover substantially the radial lower half of said pattern member;
    setting said wax;
    pouring said mold-forming material on said wax and the exposed upper radial halves of said pattern members to form said lower mold half;
    curing said lower mold half;
    separating said wax from said lower mold half and pattern members;
    arranging said lower mold half with said pattern members therein facing upwardly;
    pouring said mold forming material over said lower mold half and pattern members to form said upper mold half; and
    curing said upper mold half.

5. A method as set forth in claim 4 that includes the following steps:
    arranging said pattern members on said bottom wall radiating outwardly from a center point; and
    forming said upper and lower mold halves with a central inlet passage communicating with an irrigation ring connected with the radial inner ends of said cavities.

* * * * *